United States Patent
Barr

[11] 3,727,732
[45] Apr. 17, 1973

[54] TORQUE LIMITING CLUTCH
[76] Inventor: William H. Barr, 51 Liberty Pole Road, Hingham, Mass. 02043
[22] Filed: Apr. 5, 1971
[21] Appl. No.: 131,223

[52] U.S. Cl...............192/26, 188/77 W, 188/82.6, 192/56 C, 192/81 C
[51] Int. Cl......F16d 43/21, F16d 49/02, F16d 41/20
[58] Field of Search....................192/26, 41 S, 56 C, 192/81 C; 64/30 E; 188/77 W, 82.6

[56] References Cited

UNITED STATES PATENTS

| | | | |
|---|---|---|---|
| 1,954,620 | 4/1934 | Connell | 192/56 C |
| 2,566,539 | 9/1951 | Starkey | 192/81 C |
| 2,743,803 | 5/1956 | Ferris | 64/30 E |
| 3,177,995 | 4/1965 | Mason | 192/41 S X |

*Primary Examiner*—Allan D. Herrmann

[57] ABSTRACT

A coil spring clutch is disclosed incorporating a resilient radially cylindrical member on which the coil spring bears. The torque transmitted by the spring urges the yieldable member to contract so that the clutch will slip at a constant predetermined value of the torque. The yieldable member contracts as a result of the major tensile stresses in the helical spring, making the slip torque substantially independent of large variations in the coefficient of friction of the clutch elements. Also disclosed are means for adjusting the clutch for varying the slip torque.

10 Claims, 16 Drawing Figures

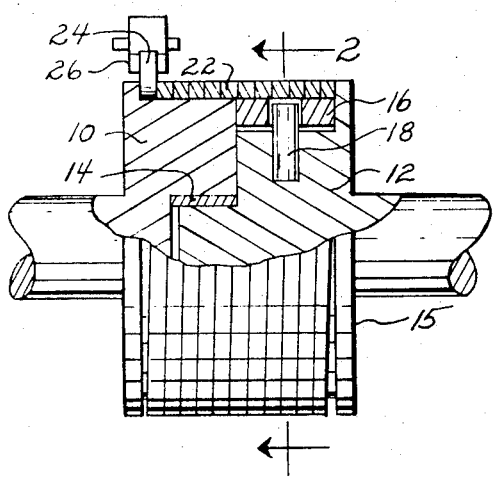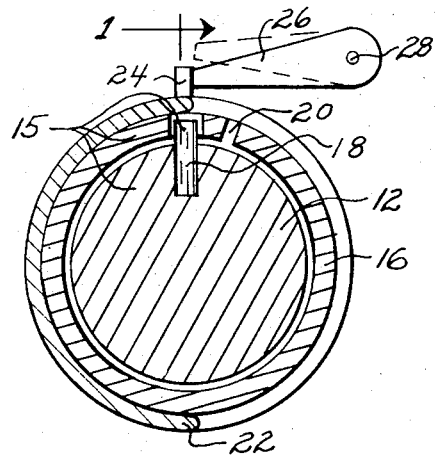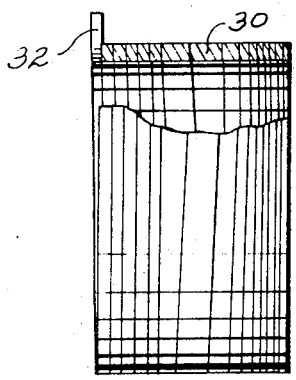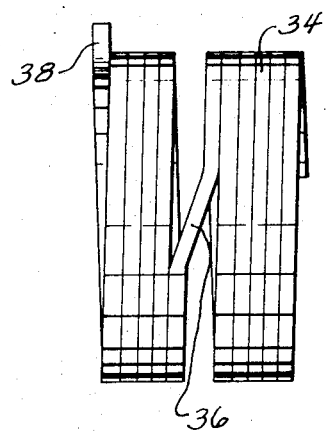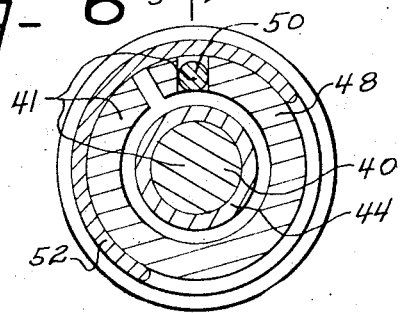

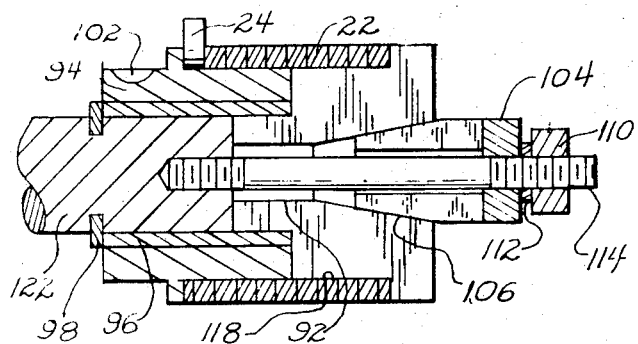
Fig. 12
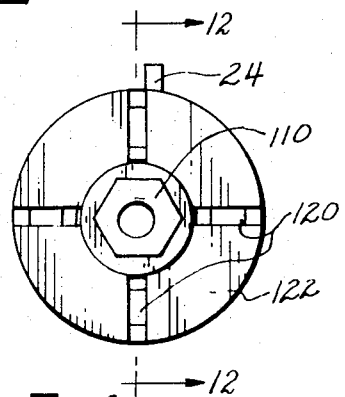
Fig. 13
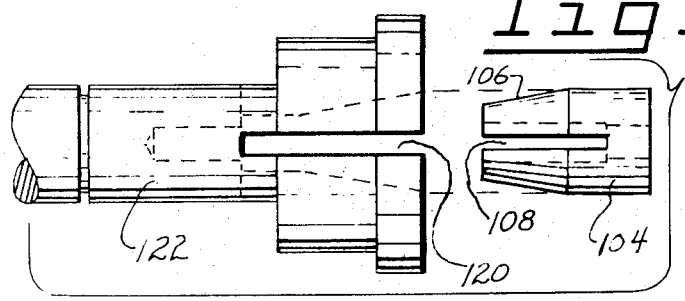
Fig. 14
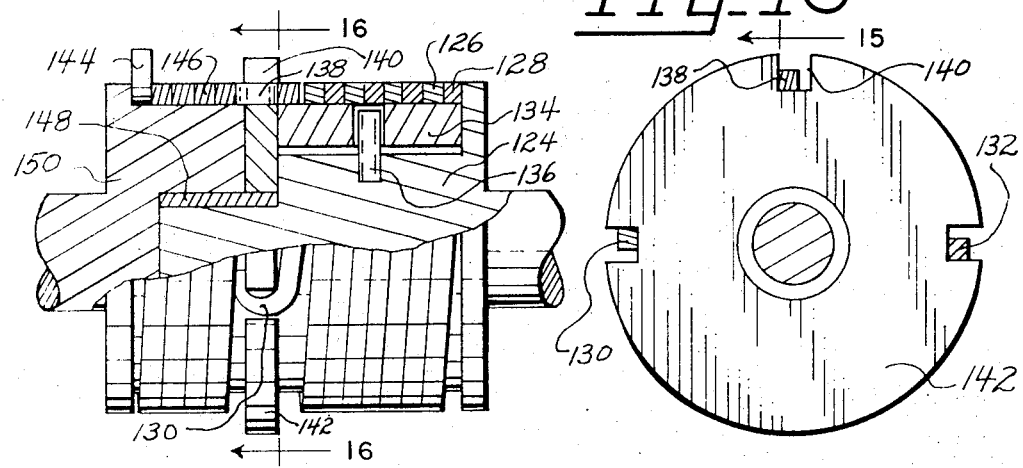
Fig. 15
Fig. 16

TORQUE LIMITING CLUTCH

BRIEF SUMMARY OF THE INVENTION

This invention relates broadly to power transmission clutches of the type in which a helical spring overlaps coaxial aligned ends of a driving member and a driven member. In this invention, one of the members has a radially yieldable surface engaging the helical spring.

Various modifications of this invention are shown and described, including different forms of the yieldable means, means for adjusting the yieldable means and means by which the invention may be used as a unidirectional limited torque engageable clutch, overload coupling or brake.

The principle object of this invention is to provide a clutch, coupling or brake that will slip at a torque value which is substantially constant and independent of variations of coefficients of friction without damage to the clutch elements.

Another object is to provide means for adjusting the mechanism so that the torque at which it slips may be varied.

DESCRIPTION OF THE DRAWINGS

FIG. 1 is a side view, partly in section, of a first embodiment of my invention.

FIG. 2 is a section of FIG. 1 taken on line 2—2 of FIG. 1.

FIG. 3 is a view in side elevation, partly in section, of an alternate spring configuration.

FIG. 4 is a side view of another alternate spring configuration.

FIG. 6 is a view in section taken on line 6—6 of FIG. 5.

FIG. 12 is a view in elevation, partly in section taken on line 12—12 of FIG. 13, of an embodiment of the invention having maximum torque adjusting means.

FIG. 13 is a view in section of FIG. 12.

FIG. 14 is a partial exploded view of several of the elements of FIG. 12.

FIG. 15 is a view in elevation, partly in section, of an embodiment of the invention including intermediate spring connecting means.

FIG. 16 is a view in section taken on line 16—16 of FIG. 15.

DESCRIPTION OF PREFERRED EMBODIMENTS

Figure 5:
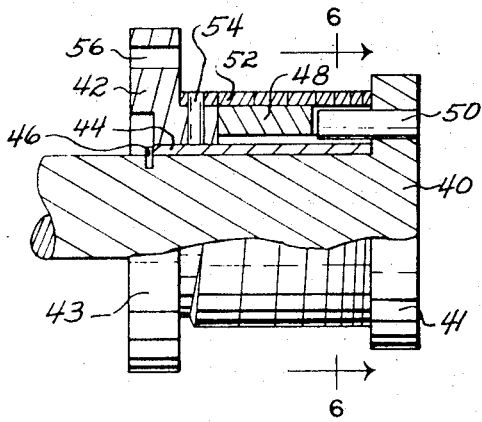
FIG. 5 is a view in elevation, partly in section, of a modified form of clutch adapted for use as a brake or overload coupling.

Referring now to FIGS. 1 and 2, rotatable driving means 10 is mounted coaxially with rotatable driven means 15, with sleeve bearing 14 maintaining proper alignment therebetween. Driven means 15 will be understood to include radially yieldable member 16, driven member 12 and pin 18 pressed into the driven member and protruding into a clearance hole in the yieldable member. The yieldable member comprises a tube of resilient material such as spring steel with a longitudinal slit 20 in one side, generally forming a "C" shape, with a slight radial clearance between its inside diameter and the outside diameter of the radially adjacent portion of the driven member, to permit radial contraction of the yieldable member.

The outwardly protruding shafts of the driving and driven members would preferably be supported, radially and axially, in external bearings (not shown). The inside diameter of helical spring 22 in its free state is less than the outside diameter of the mating outside diameters of the driving means and the yieldable member, and has a sufficient number of turns to provide firm frictional engagement therebetween. The helical spring has an outwardly bent tang 24 engageably abutting the end of pawl 26 pivotably mounted on fixed pin 28.

The driving means will disengage and overrun the driven means when rotated in a direction to unwind the helical spring, as is common in coil spring clutches. With the pawl disengaged from the tang and the driven means rotated in the opposite direction, the driving means will be frictionally connected to the driven means, urging the helical spring to tighten on the driving means and the outside diameter of the yieldable member. The inward radial force exerted by the coils of the helical spring, due to the tension in its coils, urges the yieldable member to contract. When the yieldable member has thus been urged to contract to a diameter approximately equal to the free inside diameter of the helical spring, the helical spring will loosen its grasp and the driving means will rotatively slip relative to the driven means. This slip torque value will remain constant as long as sufficient torque is applied between the driving and driven means to cause slippage.

When the pawl engages the tang of the helical spring, the grasp of the helical spring on the driving member will be released and the driving means will be disconnected from the driven means.

This embodiment may also be employed as a unidirectional constant maximum torque slip coupling or brake, by eliminating or disengaging pawl 26 and tang 24, in which case either of said means may be the driving or driven elements. When used as a brake, the driven shaft will be locked.

Describing the slipping action in greater detail, the maximum tensile stresses in the helical spring occur in the coils overlapping the line of joinder of the driving and driven means and the stress in the coils rapidly decreases as the distance from the line of joinder increases. The tensile stresses in the coils near the ends of the helical spring are very low. However, as long as the end coils of the helical spring, often referred to as "teaser coils," frictionally engage their mating cylinders, the coils near the line of joinder will be urged to firmly grasp the mating cylinders when the clutch is transmitting torque. The radial force urging the yieldable member to contract is provided primarily by the relatively highly stressed several coils near said line of joinder. This radial force will cause a general contraction of the yieldable member. The grasp of the helical spring will not be released until the end "teaser coils" have sufficiently lost their grasp, which occurs when the diameter of the yieldable member substantially equals the free inside diameter of the coils of the helical spring. While slipping, there is an equilibrium condition at which the inward radial force of primarily the highly stressed coils near the line of joinder balances the outward radial force exerted by the resilient yieldable member. The slip torque in a given clutch of this type is therefore primarily dependent on stress in these highly stressed coils, the stress being substantially proportional to the torque transmitted, and only to a minor degree affected by the friction coefficient between the helical spring and the yieldable member. The slip torque is thus primarily a function of the torque transmitted by the clutch elements. The slip torque of this invention will remain substantially constant, being little affected by changes in lubricant properties or normal wear, scuffing or other ordinary variations in the condition of the active friction surfaces. This description of the slipping action is applicable to all the embodiments of the invention and will be referred to in their descriptions to follow.

FIG. 3 shows an alternate construction of a helical spring that may be directly substituted for helical spring 22 shown in FIGS. 1, 7, 8, 10 and 12, having coils of uniform cross section. Helical spring 30 has tang 32 and coils that vary in width, being narrowest at the end of the spring and increasing in width as it approaches the center of the spring.

As already described, the maximum tensile stress in the helical spring occurs in the region overlapping the line of joinder of the driving and driven means. The resulting bearing pressures are also maximum in this region. The maximum unit bearing pressure is reduced by increasing the bearing area of the coils of the helical spring by increasing their width in this region.

FIG. 4 is another alternative construction wherein helical spring 34 has an axial jog 36 and tang 38. This helical spring may be substituted in place of helical spring 22 in FIGS. 1, 7, 8, 10 and 12, with the jog overlapping said line of joinder. The jog will provide a short portion of the helical spring crossing said line. If there is a difference in outside diameter between the yieldable member and the adjacent portion of the driving means, the jog will prevent one entire center coil of the helical spring from riding on the corner formed at the end of the larger diameter, thereby reducing the galling effects on the spring and said corner.

FIGS. 5 and 6 show an embodiment suitable for use as a unidirectional torque limited brake or coupling. Driven means 43 includes driven member 42, sleeve bearing 44 pressed into the driven member, tapered helical spring 52 and pin 54 securing the heavier end of the helical spring to the driven member. Driving means 41 includes drive member 40, longitudinally slit "C" shaped tubular yieldable member 48, pin 50 pressed into the drive member and engaging a free fitting slot in the yieldable member and axial retaining ring 46 rotatably securing the coaxial driven means on the driving means.

The helical spring is in frictional engagement with the yieldable member. The driving means will overrun the driven means when rotated in a direction to unwind the helical spring and will transmit torque to the driven member when rotated in the opposite direction, constant torque slipping occurring therebetween when the torque is great enough to cause the yieldable member to contract sufficiently to allow the helical spring to slip in the manner already described in reference to the embodiment shown in FIGS. 1 and 2. Bolt holes 56 are provided in the flange of the driven member for attaching a gear, pulley or other power takeoff means (not shown) when employed as a unidirectional torque limiting coupling. If this embodiment is to be employed as a unidirectional constant torque brake the flange of the driven member will be locked by bolting to a suitable fixed member. While a tapered helical spring is shown in this embodiment for the purpose of increasing the spring bearing area in the region of maximum stress, a spring constant cross section may be substituted therefor.

Figure 8:
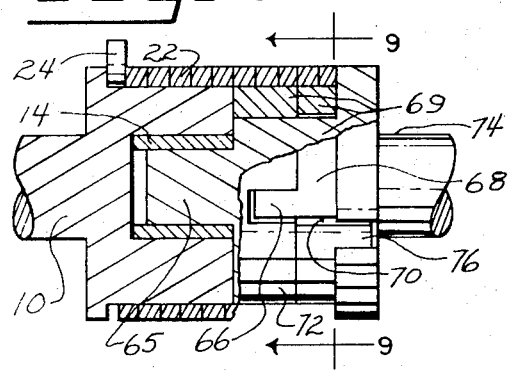
FIG. 8 is a view in elevation, partly in section, of another embodiment of the invention with a further modification of the yieldable means.
Figure 9:
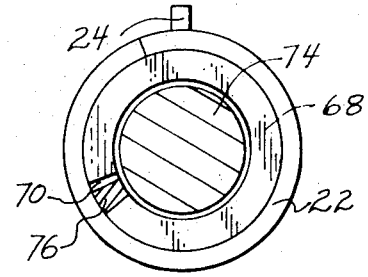
FIG. 9 is a view in section taken on line 9—9 of FIG. 8.

FIGS. 8 and 9 show an embodiment of the invention somewhat comparable to that of FIGS. 1 and 2, except that the yieldable member has been modified. Driving means 10, sleeve bearing 14, helical spring 22, tang 24 and the pivotable pawl (not shown) are as already described and shown in FIGS. 1 and 2. Driven means 69 comprises driven member 74 rotatably piloted coaxial with the driving means by cylindrical protrusion 65 extending into the sleeve bearing and yieldable means comprising radially yieldable member 68 and intermediate ring 72. The resilient radially yieldable member has a longitudinal slot 70 in one side to generally form a "C" shape, a first protrusion 76 freely engaging a mating slot in the driven member and a second protrusion 66 freely engaging a slot in the rigid intermediate ring 72, said ring mounted coaxially on the driven member with a free sliding fit therebetween. Clearance is provided between the inside diameter of the yieldable member and the adjacent outside diameter of the driven member to allow contraction of the yieldable member.

The operation of this embodiment is generally comparable to that of the embodiment shown in FIGS. 1 and 2. Therefore, only the operation of the yieldable means and associated elements of FIGS. 8 and 9 are hereafter described. With the driving means rotating in the grasping or driving direction, the relatively highly stressed coils of the helical spring 22 overlying the intermediate ring 72 will grasp it and urge it to rotate with the helical spring and the driving means. The intermediate ring is connected to the driven member by the yieldable member and its engaging protrusions so that the torque is transmitted through the yieldable member. This torque urges the yieldable member to wrap more tightly on the driven member, thereby urging its diameter to decrease. When the torque transmitted between the driving and driven members is sufficient, the yieldable member will have contracted to a diameter that will allow the overlapping end or teaser coils of the helical spring to slip, thereby relieving the locking grasp of the helical spring on the intermediate ring and allowing the clutch to slip.

The rigid intermediate ring serves to provide a constant, nonyielding friction surface matching the diameter of the abutting drum of the driving member so that there is a generally smooth, constant diameter surface formed at the line of joinder of these two elements, whereby the coil of the helical spring exerting maximum pressure overlaps the substantially smooth, continuous envelope of the abutting diameters.

Figure 7:
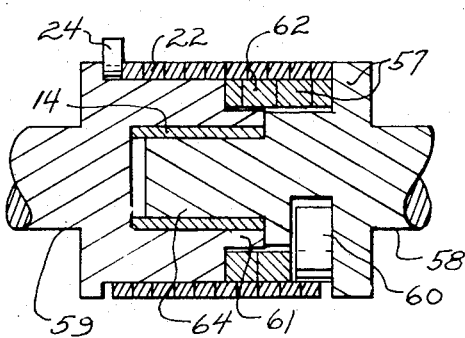
FIG. 7 is a view in elevation, partly in section, of an embodiment of the invention having a modified form of the yieldable means.

FIG. 7 is a modification of the embodiment shown in FIGS. 8 and 9, incorporating a different construction of the yieldable means and associated elements. Helical spring 22, sleeve bearing 14, tang 24 and engaging pawl (not shown) are as already described. Rotatable driven means 57 includes driven member 58 and yieldable coil spring 62, which has an inwardly protruding tang 60 freely engaging a suitable radial hole in the driven member. Radial clearance exists between the inside diameter of said yieldable coil spring and the adjacent outside diameter of the driven member to allow it to radially contract. Driving means 59 is rotatably piloted coaxial with the driven member by cylindrical protrusion 64 on the driven member extending into the sleeve bearing. Tubular coaxial extension 61 of the driving means extends within the free end of the yieldable coil spring. The yieldable coil spring is made of a resilient material such as spring steel, preferably of greater cross section area than helical spring 22, with the end abutting the driving means ground flat and having a generally smooth outside diameter and wound in the same direction as helical spring 22, so that rotation of the helical spring in a grasping direction will urge the yieldable coil spring to wrap down and decrease its outside diameter.

Operation of this embodiment is comparable to the embodiment in FIGS. 8 and 9 already described. The driving means will overrun in one direction and transmit torque to the driven means when rotated in the opposite direction up to a particular torque value, at which it will urge yieldable coil spring 62 to radially contract sufficiently to permit the helical spring to slip. Extension 61 of the driving means serves a twofold function, the first being to radially support the free end of the yieldable coil spring, thereby maintaining the outside diameter of this free end coaxial with and of the same dimension as the corresponding diameter of the adjacent portion of the driving means. The second function served is the provision of a friction surface between the yieldable coil spring and helical spring 22. Extension 61 may be omitted entirely or may be made as a separate rotatable ring and this embodiment will be operable, but with the loss of the advantages resulting from one or both of its described functions.

Figure 10:
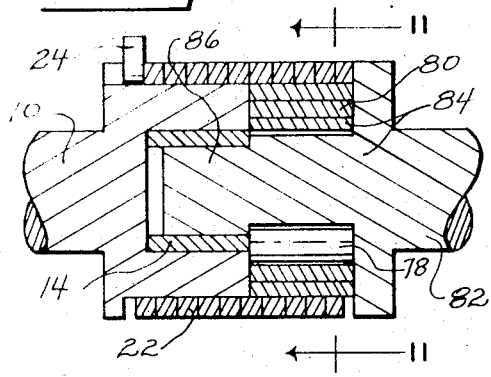
FIG. 10 is a view in elevation, partly in section, of an embodiment of the invention having another modification of the yieldable means.
Figure 11:
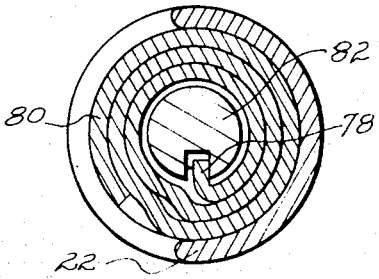
FIG. 11 is a view in section taken on line 11—11 of FIG. 10.

FIGS. 10 and 11 show another embodiment of the invention generally comparable to that shown in FIGS. 1 and 2, except for the construction of the yieldable member and associated elements. Driving means 10, sleeve bearing 14, helical spring 22, tang 24 and an engageable pawl (not shown) are as already described. Driven means 84 comprises a driven member 82 rotatably mounted and coaxially piloted to the driving means by cylindrical protrusion 86 extending within the sleeve bearing and yieldable member 80 comrpising a flat spiral spring with tang 78 on its inner end extending radially inward, freely engaging a mating slot in the driven member. Yieldable member 80 has a cylindrically ground outside diameter, said diameter frictionally engaging the inside diameter of helical spring 22. Radial clearance is provided between the inside of the yieldable member and the adjacent outside diameter of the driven member to allow radial contraction.

The operation of this embodiment is generally comparable to the embodiment shown in FIGS. 1 and 2 and already described. Only the operation of the yieldable member of FIGS. 10 and 11 and associated elements will be described. When the driving means is rotated in the engaging direction, the torque is transmitted from the helical spring to the driven member through the yieldable member 80. The spiral yieldable member is wound in a direction such that it will be urged into a smaller spiral when the outside coil is acted upon by the helical spring 22 in the engaging direction. As the transmitted torque is increased, the outside diameter of the spiral yieldable member will be urged to decrease until the helical spring slips on its surface and the driving means slips relative to the driven means.

Shown in FIGS. 12, 13 and 14 is another embodiment of the invention in which driven member 122 has a spring collet comprising a substantially cylindrical collar 118 with radial slits 120 and axial bore 92 therein to permit elastic radial compliance of the sectors of collar 118. Driving member 94 has sleeve bearing 96 pressed coaxially in its bore for rotatably mounting on the shaft of the driven member, which is axially secured thereon by retaining ring 98. Helical spring 22 frictionally engages the spring collet and the adjacent diameter of driving member 94 and has tang 24 extending radially outward for selectively engaging a pawl (not shown), as already described. The driving member has a collar portion with keyway 102 therein for mounting a gear, pulley or other device for applying power thereto. Adjusting nut 110, lockwasher 112 and radially resilient expander 104 are mounted in axially adjustable manner on threaded stud 114, coaxially fixed to driven member 122. Said expander has a conical surface 106 with radial slits 108 forming conical, resilient sectors and a through coaxial bore surrounding the threaded stud. Said conical resilient sectors bear against a mating interior conical surface of the spring collet. The spring collet portion of the driven member provides a resilient radially yieldable means, adjustable reinforced radially by resilient expander 104.

The expander and associated elements provide means for adjusting the magnitude of the radially inward acting forces of helical spring 22 required to urge the spring collet to contract to a diameter substantially equal to the inside diameter of the helical spring, under which condition the helical spring will slip with respect to the spring collet. Therefore, when the expander is adjusted to a position toward the driving member, the torque required for slipping will be decreased, provided the mating conical surfaces of the expander and the driving member are in engaging contact.

It will be clear to those skilled in the art that the construction shown in FIGS. 12, 13, 14 may be modified for use as a non-adjustable torque limited clutch by eliminating the expander 104, adjusting nut 110, lockwasher 112 and threaded stud 114. It may also be modified for use as a unidirectional slip coupling or brake by removing tang 24 and associated selectively engageable pawl, or by rigidly connecting the near end of the helical spring to the driving member.

Referring now to the embodiment shown in FIGS. 15 and 16, a first helical spring 146, having an actuator engaging tang 144 at one end for selectively engaging a pawl (not shown), frictionally engages rotatable driving member 150 and has a loop 138 on its other end secured to slot 140 in rotatable intermediate means 142. Bushing 148 pressed into the driving member provides a coaxial bearing surface for said intermediate means and cylindrical protrusion 152 on rotatable coaxial driven member 124. A pair of interleaved second helical springs 126 and 128, each having a looped end 130 and 132 engaging slots in the intermediate means, frictionally engage longitudinally slit "C" shaped yieldable member 134, contractably connected to the driven member by pin 136 protruding into a loose fitting hole in the yieldable member.

The driving member will overrun when rotating in a direction to unwind the helical springs. When rotated in the opposite direction, said first helical spring will solidly grasp the driving member, thereby frictionally connecting the intermediate means and said second helical springs to the driven member through the second frictional engagement of the second helical spring and the yieldable member and pin 136. Torque transmitted between the driving and driven members will urge the yieldable member to contract and when this torque is sufficient, the pair of interleaved springs will slip in the manner already described in reference to FIGS. 1 and 2.

This embodiment of the invention has two main advantages. The first is the elimination of the condition wherein coils of any of the helical springs engageably overlap and bear on the line of joinder between the driving member and the yieldable member. The employment of a pair of interleaved springs connected to the intermediate means at approximately 180° spacing will produce a substantially pure torque couple with no transverse force component. This provides the second advantage of the elimination of major transverse loading of the yieldable member such as occurs when a single coil transmits the torque between the driving and driven members.

The embodiment of the invention as described and shown in FIGS. 15 and 16 may be modified by replacing both the first helical spring 146 and the pair of second helical springs 126 and 128 with a single spring comparable to that shown in FIG. 4 and already described. In this modification, a jog comparable to jog 36 in FIG. 4 will pass through slot 140 in intermediate means 142, one end of said single spring frictionally engaging rotatable drive member 150 and the other end engaging yieldable member 134. To accomplish this, slot 140 would be made arcuately wider to accept the full length of the jog, as shown in FIG. 4.

It will be clear to those skilled in the art that many features shown and described, relative to specific embodiments, may be incorporated in other embodiments, such as the substitution of the yieldable members shown in FIGS. 1, 7, 8, 10 and 12 for the yieldable member in the embodiment shown in FIGS. 5 and 15, without violating the intent or scope of the invention.

I claim as my invention:

1. A torque transmitting device comprising a first rotatable drive means, a second coaxial rotatable drive means having substantially coaxial cylindrical radially elastic means connected thereto and helical means engaging said first drive means and frictionally engaging said elastic means, said elastic means being operatively urged by the torque transmitted between said first and second drive means to yield radially to loosen its frictional engagement with said helical means and decrease the maximum torque transmittable by the device.

2. A torque transmitting device according to claim 1 in which said elastic means comprises a longitudinally slit tube.

3. A torque transmitting device according to claim 1 in which said elastic means comprises a helical member wound in the same direction as said helical means.

4. A torque transmitting device according to claim 1 in which said elastic means comprises a spring collet.

5. A torque transmitting device according to claim 1 with means to radially bias said elastic means.

6. A torque transmitting device according to claim 1 with means engageably acting on one end of said helical means to selectively stop the rotation of the helical means.

7. A coil spring clutch of the type comprising a driving drum, a driven drum and a coaxial helical spring in frictional engagement therewith, wherein the improvement comprises a substantially torque responsive, radially yielding means limiting the maximum torque capacity of the clutch incorporated in the structure of one of said drums.

8. A coil spring clutch according to claim 7 with adjustable means biasing said yielding means for varying the maximum torque capacity of the clutch.

9. A unidirectional coil spring brake of the type comprising a helical spring frictionally engaging a drum, wherein the improvement comprises a torque responsive, radially yielding means for limiting the maximum braking torque capacity incorporated in the structure of said drum to frictionally engage said helical spring.

10. A unidirectional coil spring brake according to claim 9 with adjustable means biasing said yielding means for varying said maximum braking torque capacity of the brake.

* * * * *